United States Patent
Inoue et al.

(10) Patent No.: US 6,938,551 B2
(45) Date of Patent: Sep. 6, 2005

(54) METHOD OF MAKING INSTRUMENT PANEL FOR VEHICLES

(75) Inventors: Hitoshi Inoue, Shizuoka (JP); Akira Ikeda, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/799,768

(22) Filed: Mar. 15, 2004

(65) Prior Publication Data

US 2004/0173108 A1 Sep. 9, 2004

Related U.S. Application Data

(62) Division of application No. 10/138,298, filed on May 6, 2002.

(51) Int. Cl.[7] .................................................. B41J 2/01
(52) U.S. Cl. .................. 101/491; 101/35; 347/107; 116/28 R; 116/298; 428/32.24
(58) Field of Search ............................... 101/35, 41, 211, 101/491, 483; 347/2, 105, 107; 116/334, 335, 28, 51, 57, 62.1, 62.2, 284, 298, 304, 305, 28 R; 428/32.1, 32.11, 32.24, 32.13, 32.14, 32.23, 32.28, 32.31

(56) References Cited

U.S. PATENT DOCUMENTS

| | | | | |
|---|---|---|---|---|
| 5,601,928 A | * | 2/1997 | Katayama et al. | 428/500 |
| 6,548,150 B1 | * | 4/2003 | Ishikawa et al. | 428/323 |
| 6,573,877 B2 | * | 6/2003 | Wedel et al. | 345/4 |
| 6,599,613 B1 | * | 7/2003 | Kasahara et al. | 428/140 |

FOREIGN PATENT DOCUMENTS

| | | | |
|---|---|---|---|
| JP | 11-326548 | * | 11/1998 |
| JP | 2000-111660 | * | 4/2000 |
| JP | 2002-127389 | * | 5/2002 |
| JP | 2004-34642 A | * | 2/2004 |
| WO | WO 98/36420 | * | 8/1998 |
| WO | WO 01/45957 | * | 6/2001 |

* cited by examiner

*Primary Examiner*—Leslie J. Evanisko
(74) *Attorney, Agent, or Firm*—Sughrue Mion, PLLC

(57) ABSTRACT

An ink permeative layer is deposited so as to cover at least one of an obverse face and a reverse face of a substrate. Digital print data is prepared according to a design of the instrument panel including indicative scales, indicative numerals, indicative characters and indicative symbols on the instrument panel which are visually presented to a driver. Ink is jetted to the ink permeative layer in accordance with the digital print data. The design of the instrument panel is determined according to a request of the driver.

7 Claims, 5 Drawing Sheets

METHOD OF MAKING INSTRUMENT PANEL FOR VEHICLES

This is a divisional of application Ser. No. 10/138,298 filed May 6, 2002; the disclosure of which is incorporated herein by reference.

BACKGROUND OF THE INVENTION

The present invention relates to an instrument panel used for vehicles, and relates more specifically to an instrument panel that is used for meters mounted on a vehicle, wherein scales, numbers, characters and symbols are printed on a substrate in order to indicate a measured value through interaction with a pointer located forward of the substrate.

A related indicator plate of this type is generally used for a vehicular meter such as is shown in FIG. 4. For the vehicular meter in FIG. 4, an internal device 2 is located in a meter case 1, and an output shaft 2a of the internal device 2 is pivoted at an angle in accordance with a predetermined measured value, such as vehicle velocity or engine revolutions, to drive a pointer 3 that at its proximal end is securely fixed to the output shaft 2a. As a result, the pointer 3 points to indicators 4a (FIG. 5), constituting a scale or a series of characters, on the surface of a vehicular instrument panel (hereinafter also referred to simply as an instrument panel) that is located between the internal device 2 and the pointer 3, so as to visually present a measured value.

A light source 5 is provided for illumination at the back of the meter case 1, and light emitted by the light source 5 is guided along a light guide plate 6 and transmitted to the reverse face of the instrument panel 4. The light that is so conducted passes through the instrument panel to the obverse face, illuminating the transparent indicators 4a on the obverse face of the instrument panel 4, while a mask 7, superimposed on the front face of the instrument panel 4, covers those portions around the periphery of the instrument panel 4 for which no illumination is required. Across the front of the mask 7, a protective cover 8 is positioned so that it covers and protects the panel 4 and the pointer 3, and prevents dust from entering the area to its rear.

As is shown in a cross-sectional view in FIG. 6, the instrument panel 4 includes a transparent substrate 4b, and a transparent illumination color layer 4c having high lightness is positioned on the obverse surface of the transparent substrate 4b. Further, a shading layer 4d is disposed across the entire surface of the transparent display color layer 4c, excluding the portion having the shapes of the scales and the characters of the indicators 4a. For the thus arranged instrument panel 4, the transparent illumination color layer 4c and the shading layer 4d are provided by repeating the screen printing of individual colors.

The design of a related instrument panel 4 is determined for each vehicle type, and does not specifically reflect the tastes or needs of individual drivers. On the other hand, there has recently been noted a demand for a variety of the instrument panel 4 designs intended to enhance the product value of vehicles. However, since as is described above, screen printing is employed for instrument panels 4, an extended setup time is required, owing primarily to the need to exchange printing plates and to replace one ink with another, and since printing is performed for each color, individually, the printing time is also extended. Thus, it is difficult to cope with the production of small quantities of a variety of instrument panel 4 types.

SUMMARY OF THE INVENTION

It is therefore an object of the present invention to provide an instrument panel for a vehicle such that the production of small quantities of various types can be coped with.

In order to achieve the above object, according to the present invention, there is provided an instrument panel mounted on a vehicle, comprising:

a substrate; and a first ink reception layer, which covers an obverse face of the substrate and causes ink to permeate therein, wherein the ink permeated in the first ink reception layer forms at least part of indicative scales, indicative numerals, indicative characters and indicative symbols on the instrument panel which are visually presented to a driver.

In this instrument panel, indicators are printed on the ink reception layer on the obverse surface of the substrate based on digital print data prepared in consonance with the taste of a user, such as the driver of an automobile, to describe a desired design on the instrument panel. Further, an ink jet printer or a laser printer can be employed for the printing based on the digital print data. Thus, unlike the screen printing, there is no need for screen plates to be used to overlap individual colors, so that screen printing plate exchange and ink replacement are not required, and only a single printing sequence is required to print indicators having a desired design on the ink reception layer. As a result, the time required to print an instrument panel can be reduced. And further, since simply by changing digital print data a different indicator can be printed on an instrument panel, the production of small quantities of a variety of instrument panel types can be coped with.

In view of the above, according to the present invention, there is also provided a method of manufacturing an instrument panel mounted on a vehicle, comprising the steps of:

providing a substrate;

depositing an ink permeative layer so as to cover at least one of an obverse face and a reverse face of the substrate;

providing digital print data according to a design of the instrument panel including indicative scales, indicative numerals, indicative characters and indicative symbols on the instrument panel which are visually presented to a driver; and jetting ink to the ink permeative layer in accordance with the digital print data.

Preferably, the manufacturing method further comprises the step of determining the design of the instrument panel according to a request of the driver.

Preferably, the instrument panel further comprises a second ink reception layer, which covers a reverse face of the substrate and causes ink to permeate therein. Here, the ink permeated in the second ink reception layer forms at least part of the indicative scales, the indicative numerals, the indicative characters and the indicative symbols. The substrate is made of a transparent material.

In addition to the above advantages, such an instrument panel is especially effective when used for a meter wherein light emitted by a light source is transmitted from the reverse surface of the instrument panel, and is used for a display presented to visually represent various vehicle states. Therefore, an instrument panel based on a desired design corresponding to the taste of a user and featuring high visibility can be easily produced.

Preferably, the first ink reception layer and the second ink reception layer are made of a heat-resistant material.

In this instrument panel, when the temperature within the vehicle in which the instrument panel is mounted is raised, the ink reception layer is neither deformed nor adversely affected by the high temperature, so that deterioration of the visibility feature of the indicators on the instrument panel is prevented. Therefore, a heat resistant instrument panel for a vehicle can be easily produced.

Preferably, at least one of the first ink reception layer and the second ink reception layer includes a light-diffusion material therein.

In this instrument panel, the light provided for the illumination of the instrument panel is diffused at the ink reception layer. An additional light diffusion layer (member) is not required so long as the light diffusion material is contained in the ink reception layer on the light source side. Therefore, an instrument panel structure can be provided more simply.

Preferably, the instrument panel further comprises an adhesive layer which adheres the substrate and at least one of the first ink reception layer and the second ink reception layer with each other.

In this instrument panel, since a less viscous material can be employed for an ink reception layer, so long as ink can be easily permeated therein, the choices available for the material to be used for the ink reception layer can be increased.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

Figure 1A:
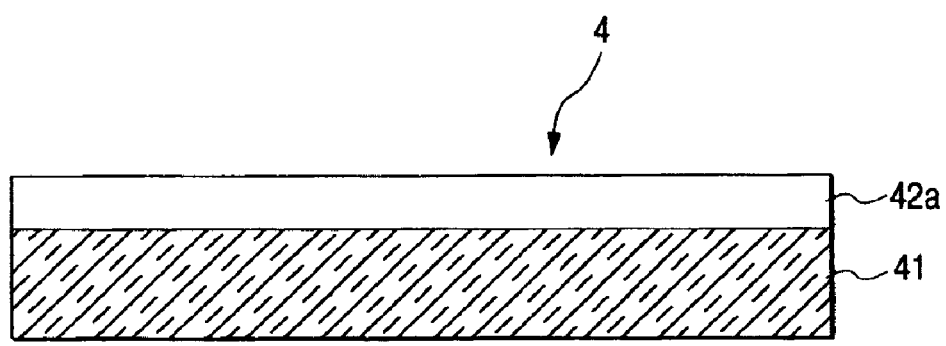
FIGS. 1A and 1B are cross-sectional views of an instrument panel for a vehicle according to a first embodiment of the present invention.

An instrument panel for a vehicle will now be described according to preferred embodiments of the present invention with reference to FIGS. 1A through 3C. The reference numerals employed to denote components used for the related art are also employed to denote corresponding or identical components used for the embodiments, and no further explanation for them will be given.

The first embodiment of the invention will now be described while referring to FIGS. 1A and 1B.

As is shown in FIG. 1A, a vehicle instrument panel (hereinafter referred to simply as an instrument panel) has a transparent substrate 41. A polycarbonate (resin), acryl or a plastic material can be employed for the substrate 41, which in this embodiment has a thickness of is 0.3 to 10 mm. When it is adopted a meter in which the instrument panel 4 is illuminated from a front side thereof, a non-transparent material can also be employed for the substrate 41.

An ink reception layer 42a is deposited on the surface of the substrate 41 by coating it with an anchor coat material that includes 20 to 80% of at least one of an urethane resin or a polyester resin. Since the instrument panel 4 is used for a meter to be mounted in a vehicle, it is preferable that the material of the ink reception layer 42a have excellent heat resistance for temperatures of from 90 to 130 degrees, and that it be ink-permeable.

Figure 5:
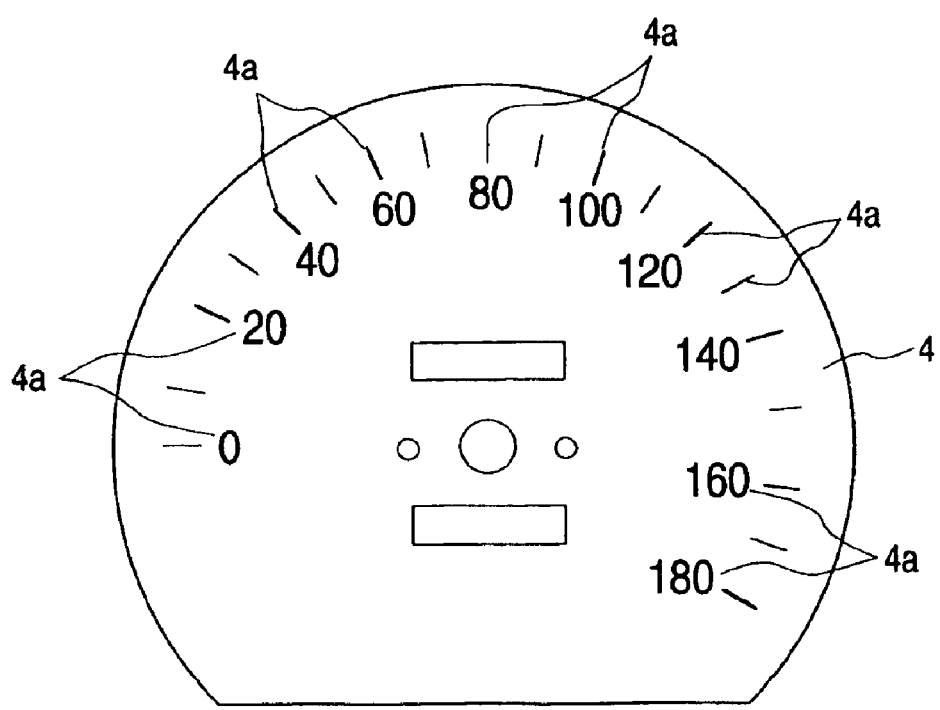
FIG. 5 is a plan view of the instrument panel.
Figure 6:
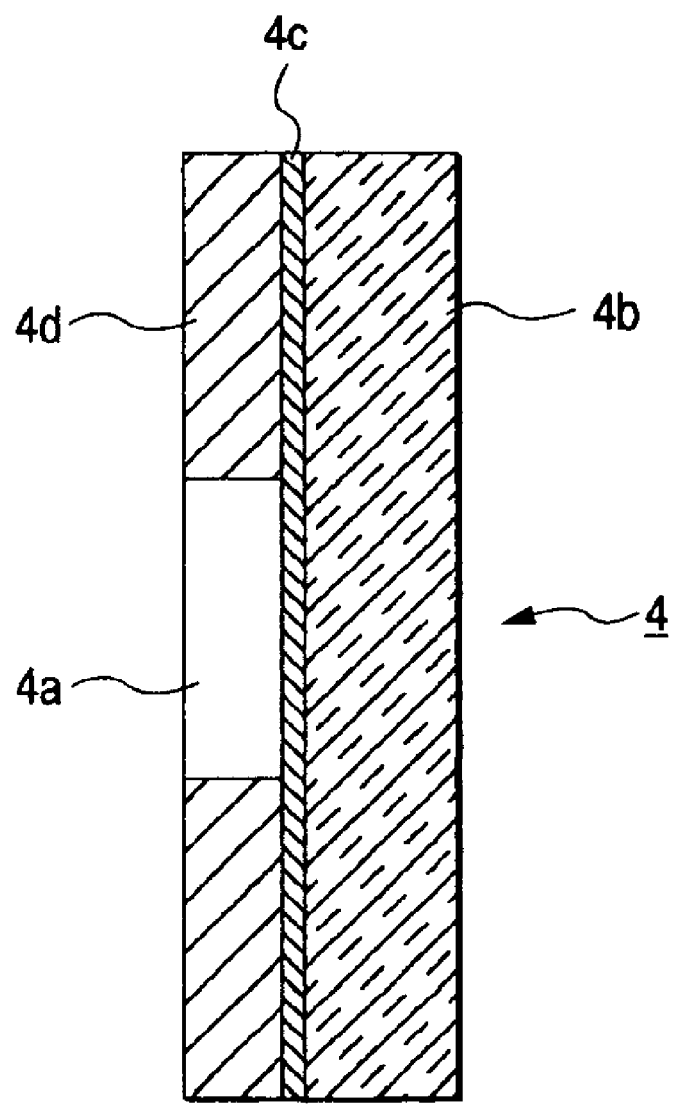
FIG. 6 is a partial cross-sectional view of a related instrument panel.

Based on digital print data, the indicators (see FIG. 5), such as scales, numbers, characters and symbols, and the background of the instrument panel 4 are printed on the ink reception layer 42a provided for the instrument panel 4 in accordance with a desired design.

Laser printing, digital offset printing or ink jet printing can be employed. In this embodiment, to reduce expenses, ink jet printing is employed, since the investment required for the facility, such as an ink jet printer, for performing the printing procedures is small.

The method for manufacturing the instrument panel 4 according to the first embodiment will now be described.

First, the design of the instrument panel 4 is discussed with a user, such as a driver or an automobile manufacturer, and digital print data is generated in accordance with a determined design. For example, digital print data is generated by using software that reflects the taste of a user in the digital print data associated with a predetermined template, or software that permits the user to select a favorite design from among multiple examples of sample digital print data that have been prepared and stored in a database.

Figure 1B:
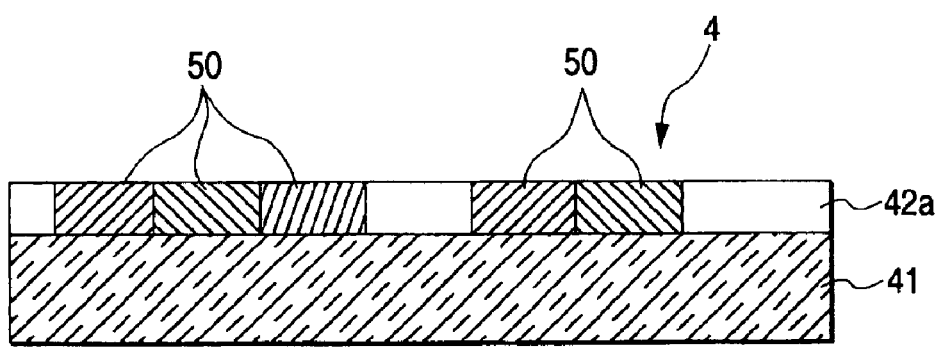

While the instrument panel 4 having the ink reception layer 42a is set up for the ink jet printer, based on digital print data received from a personal computer, the ink jet printer ejects small particles of ink 50 of multiple colors from the ink jet head onto the ink reception layer 42a (see FIG. 1B). As a result, using the ink 50 landed on the ink reception layer 42a, the desired design is printed on the surface of the instrument panel 4, so that the indicators and the overall area (background), excluding the portions occupied by the shapes of the indicators, have different colors.

As is described above, since the ink reception layer 42a is formed on the instrument panel 4, the printing performed using the ink jet printer is enabled based on the digital print data so that the repetitive screen printing of individual colors need not be performed using screen printing plates. Thus, the exchange of the screen printing plates and the replacement of ink are not required, and only a single process is required to complete the printing of the surface of the instrument panel 4. As a result, the printing time required for the instrument panel 4 can be reduced.

Further, since the digital print data is employed for the printing of the instrument panel 4, the digital print data consonant with a user, such as a driver or an automobile manufacturer, need only be generated to produce an instrument panel 4 in accordance with the desired design. That is, the provision of an order-made instrument panel 4 is enabled, and the production of small lots of various types of instrument panels 4 can be easily coped with.

The second embodiment of the present invention will now be described while referring to FIGS. 2A and 2B.

Figure 2A:
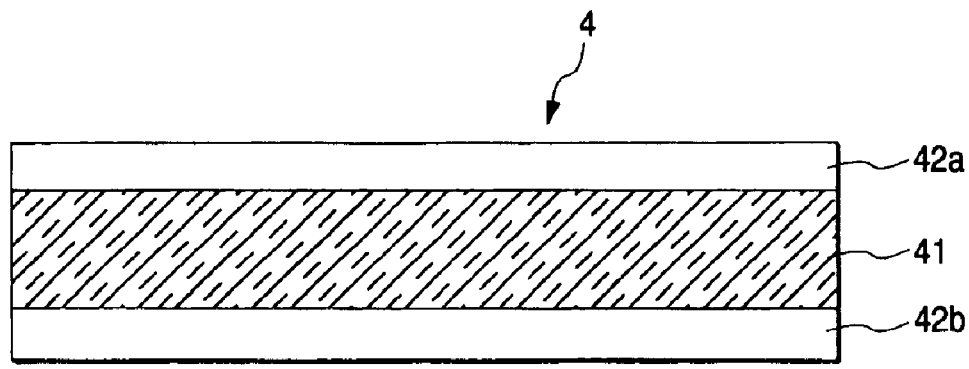
FIGS. 2A and 2B are cross-sectional views of an instrument panel for a vehicle according to a second embodiment of the present invention.

As is shown in FIG. 2A, for the instrument panel 4 a substrate 41 is formed in the same manner as in the first embodiment, and ink reception layers 42a and 42b are then deposited on the obverse and reverse surfaces of the substrate 41. As in the first embodiment, it is preferable that the ink reception layers 42a and 42b be formed of an anchor coat material that contains 20 to 80% of at least one of a urethane resin or a polyester resin, and that the ink reception layers 42a and 42b exhibit excellent heat resistance to temperatures of from 90 to 130 degrees and be ink-permeable.

Further, when a light diffusion material, such as glass beads, organic beads or inorganic particles, is contained in at least one of the ink reception layers 42a and 42b, emitted light striking the instrument panel 4 is diffused in the ink reception layer 42a or 42b. When the instrument panel 4 is employed for a meter for which light emitted by a light source passes through the instrument panel 4 from the reverse face and is employed to visually represent various states of a vehicle, a related light diffusion layer (member) is not required so long as the light diffusion material is contained in the ink reception layer 42a on the light source side.

In the second embodiment, since the ink reception layer 42b is deposited on the reverse face of the substrate 41, it is preferable that at the least the ink reception layer 42a on the obverse face of the substrate 41 be formed of a transparent material. In addition, as in the first embodiment, ink jet printing is employed for the ink reception layers 42a and 42b.

The method for manufacturing the instrument panel 4 according to the second embodiment will now be explained.

First, the design of the instrument panel is discussed with a user, such as a driver or an automobile manufacturer, and digital print data consonant with a determined design is generated. In the second embodiment, the digital print data includes individual print data for the obverse face and the reverse face of the substrate 41.

When an alarm indicator representing a warning is to be printed on the reverse face of the substrate 41 while obtaining a good transparent balance, print data for the obverse face is generated to print the area excluding the portion shaped like the alarm indicator, and in accordance with the obverse face print data, print data for the reverse side is generated to print an alarm indicator on the reverse surface of the substrate 41. Then, the digital print data, including both the obverse face print data and the reverse face print data, is obtained.

Figure 2B:
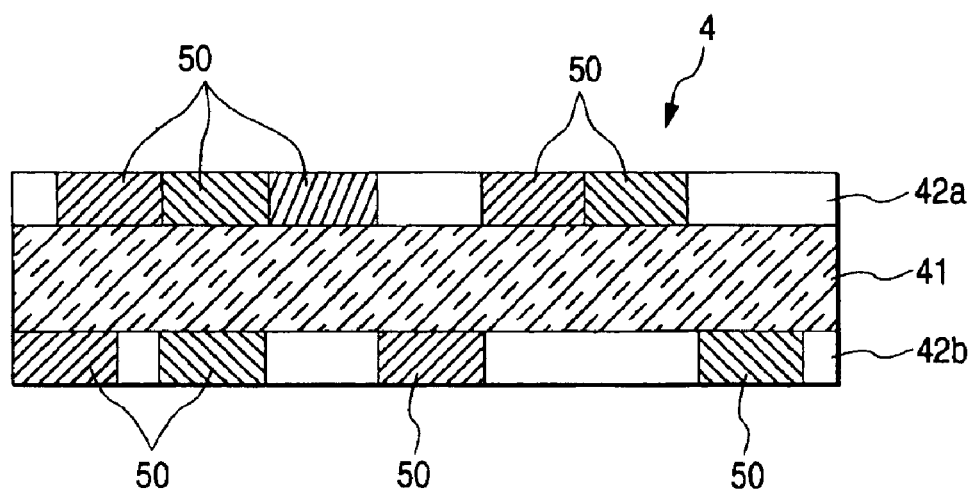

While the instrument panel 4 is set up for the ink jet printer to use the ink reception layer 42a as the face to be printed, the ink jet printer receives the digital print data acquired from a personal computer, and employs the included print data for the obverse face to eject small particles of ink 50 of multiple colors through the ink jet head onto the ink reception layer 42a (see FIG. 2B).

When the ink on the ink reception layer 42 has dried, and the instrument panel 4 has been inverted and has been set up so that the ink jet printer will use the ink reception layer 42b as the face to be printed, the ink jet printer employs the print data for the reverse face to eject the small particles of ink 50 of multiple colors from the ink jet head onto the ink reception layer 42b (see FIG. 2B).

With the ink 50 landed on the ink reception layers 42a and 42b, excluding the portion having the shape of the alarm indicator, the indicators and the background are printed on the obverse face of the instrument panel 4, and the alarm indicator is printed on the reverse face of the instrument panel 4. The printing order is not thus limited, and the reverse face of the substrate 41 may be printed first and then the obverse face may be printed.

As is described above, since the ink reception layers 42a and 42b can be deposited on the obverse and reverse faces of the instrument panel 4, even when both sides of the instrument panel 4 must be printed in order to obtain a good transparent balance, based on the digital print data, printing can be performed using an ink jet printer. Therefore, since the repetitive printing of individual colors for which the screen printing plates are used is not required, the exchange of the screen printing plates and the replacement of the ink are not required, and the printing of the obverse and reverse faces of the instrument panel 4 can be respectively completed by a single process. As a result, the time required for printing the instrument panel 4 can be reduced.

Since the digital print data are employed to print the instrument panel 4, the digital print data need only be generated in accordance with the taste of a user, such as a driver or an automobile manufacturer, so that the instrument panel 4 can be produced by the design corresponding to the taste. That is, an order-made instrument panel 4 can be provided. Thus, as in the first embodiment, the production of small lots of various types of instrument panels 4 can be easily coped with.

The third embodiment of the invention will now be described while referring to FIGS. 3A to 3C.

Figure 3A:
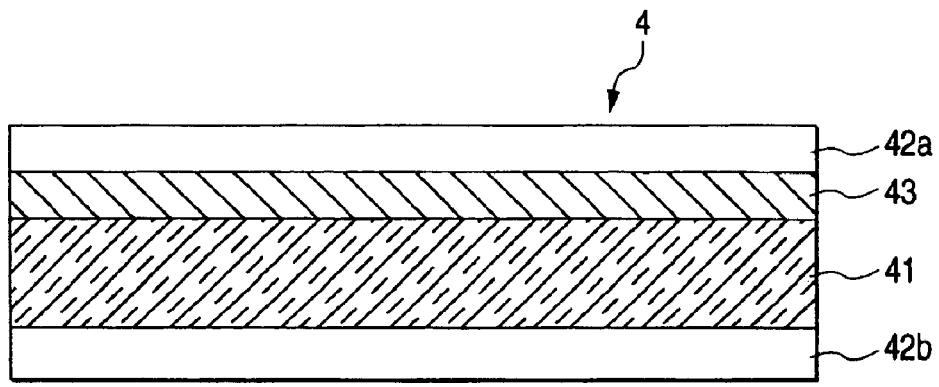
FIGS. 3A to 3C are cross-sectional views of an instrument panel for a vehicle according to a third embodiment of the present invention.
Figure 3B:
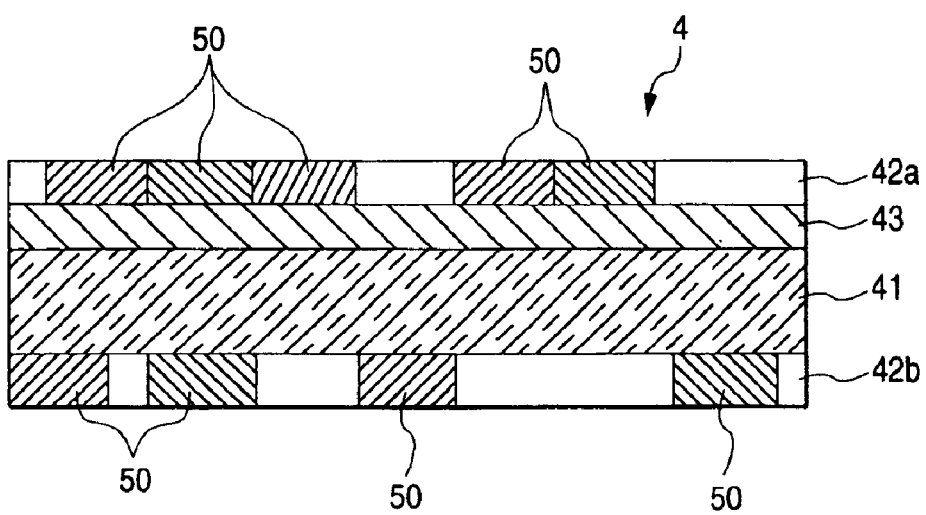
Figure 3C:
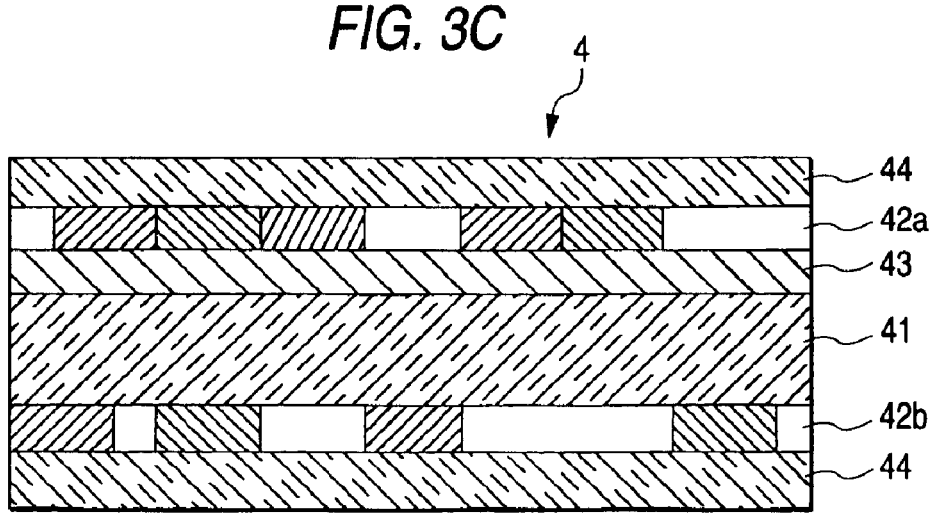
Figure 4:
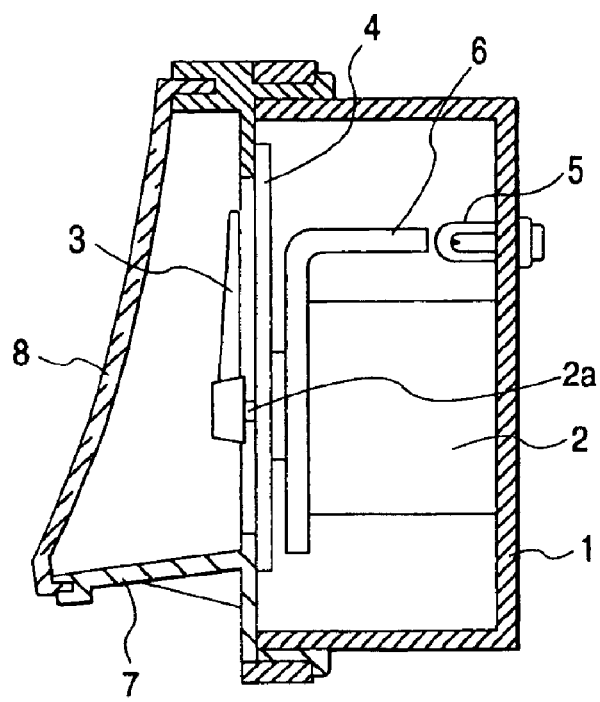
FIG. 4 is a cross-sectional view of a common vehicle meter for which an instrument panel is employed.

As is shown in FIG. 3A, the basic structure of the instrument panel 4 is the same as that for the second embodiment. In the third embodiment, an adhesive layer 43 is located between a substrate 41 and an ink reception layer 42a to improve the adhesion of the ink reception layer 42a to the substrate 41. Then, so long as ink can be easily fixed to the ink reception layer 42a, a less viscous material can also be used as the layer 42a, so that the available choices for the material for the ink reception layer 42a can be increased. The adhesive layer 43 may also be located between the substrate 41 and an ink reception layer 42b.

The adhesive layer 43 is obtained by depositing a polyester resin or a vinyl butyral resin on the substrate 41. When the adhesive layer 43 has the same color providing excellent visibility as the illumination color used for the character plane 4, the visibility of the design of the instrument panel 4 can be improved.

When an adhesive layer 43 of black, white or gray is provided, in the normal state the alarm indicator printed on the reverse surface of the substrate 41 is invisible, but in the alarm state, a warning lamp is turned on and the light emitted by the lamp is transmitted through the substrate 41, the adhesive layer 43 and the ink reception layer 42a, so that the alarm indicator printed on the ink reception layer 42b becomes visible and can be used to alert a driver.

Further, in the third embodiment, a top coat layer 44 is deposited on the surfaces of the ink reception layers 42a and 42b to protect these layers 42a and 42b and to adjust the gloss. The top coat layer 44 can also be employed for the first and the second embodiments.

The method for manufacturing the instrument panel 4 according to the third embodiment will now be described.

First, the design of the instrument panel 4 is discussed with a user, such as a driver or an automobile manufacturer, and the digital print data is generated in accordance with the design thus determined. As in the second embodiment, the digital print data includes print data both for the obverse face and the reverse face of the substrate 41.

An alarm indicator for a warning is printed on the reverse face of the substrate 41 to improve the transparent balance, and the adhesive layer 43 is employed to alert the driver using the white or blue background of the instrument panel 4. The print data for the obverse face is generated to print the indicators, excluding the alarm indicator, while the print data for the reverse face is also generated to print the alarm indicator on the reverse face of the substrate 41. In this fashion, the digital print data, including the obverse face print data and the reverse face print data, are obtained.

The ink reception layer 42 is laminated on the adhesive layer 43 deposited on the obverse face of the substrate 41, and the ink reception layer 42b is formed on the reverse face. Then, when the instrument panel 4 is set up so that the ink jet printer can use the ink reception layer 42a as the face to be printed, the ink jet printer receives digital print data from a personal computer, and employs the obverse face print data included in the digital print data to eject small particles of ink 50 of multiple colors through the ink jet head onto the ink reception layer 42a.

When the ink 50 on the ink reception layer 42a has dried, and the instrument panel 4 has been inverted and set up so the ink jet printer can use the ink reception layer 42b as the face to be printed, the ink jet printer employs the reverse face print data of the digital print data to eject small particles of multiple ink 50 colors from the ink jet head onto the ink reception layer 42b. As is shown in FIG. 3B, the top coat layer 44 is laminated on the ink reception layers 42a and 42b.

As a result, with the ink 50 landed on the ink reception layers 42a and 42b, the indicators is printed, excluding the portion having the shape of the alarm indicator, on the surface of the instrument panel 4, and the alarm indicator is printed on the reverse face. Thus, while the color of the adhesive layer 43 is employed as the background color for the instrument panel 4, the driver can identify the indicators that are printed on the ink reception layer 42a that is laminated on the adhesive layer 43, while the alarm indicator printed on the ink reception layer 42b on the reverse face of the substrate 41 can be viewed by the driver through the substrate 41, the adhesive layer 43, the ink reception layer 42a and the top coat layer 44.

As is described above, since the ink reception layers 42a and 42b can be deposited on the obverse and reverse faces of the substrate 41, even when both faces of the instrument panel 4 must be printed to improve the transparent balance of the panel 4, the printing using the ink jet printer based on the digital print data can be performed. Therefore, since the repetitive printing of individual colors using screen printing plates is not required, the exchange of screen printing plates and the replacement of ink are not required, and printing of the obverse and of reverse faces of the instrument panel 4 can each be completed by a single process. Thus, the time required for printing the instrument panel 4 can be reduced.

Since the digital print data is employed to print the instrument panel 4, the digital print data need only be generated in accordance with the taste of a user, such as a driver or an automobile manufacturer, so that the instrument panel 4 can be produced in accordance with the design desired by the user. That is, provision of an order-made of the instrument panel 4 is enabled. And thus, as in the first and the second embodiments, the production of small lots of various types of instrument panels 4 can be easily coped with.

Furthermore, in the third embodiment, since the adhesive layer 43 is located between the substrate 4 and the ink reception layer 42a, the adhesion of the ink reception layer 42a to the substrate 41 can be improved even more than in the first and the second embodiments. And since the adhesive layer 43 is employed as the background for the instrument panel 4, and only the indicators need be printed on the ink reception layers 42a and 42b, the printing time can be reduced.

In the first to the third embodiments, the ink reception layer 42a is formed using only the anchor coat material. However, an ink absorption resin, such as polyvinyl alcohol, an acrylic resin, a styrene-acryl copolymer or an ethylene-vinyl acetate copolymer, may be laminated on the anchor coat material to provide the ink reception layer 42a.

Furthermore, in the second and the third embodiments, the adhesive layer 43 is visibly identifiable as the background of the instrument panel 4. However, various structures in accordance with a desired design can be employed to visibly alert the user of the instrument panel 4, e.g., the adhesive layer 43 can be employed to visibly identify the background and scales on the instrument panel 4, and indicators having the same color as the background.

In addition, in the first to the third embodiments, the instrument panel 4 has been explained for use for a meter whereby a measured value is indicated by the interaction of a pointer with an indicator printed on the substrate 41. However, various other forms can be employed, depending on the configurations of meters for which the instrument panel 4 is used; for example, a measured value can be indicated in cooperation with the displayed contents of a liquid crystal display.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A method of manufacturing an instrument panel mounted on a vehicle, comprising the steps of:
   providing a substrate;
   depositing a first ink permeative layer over a first face of the substrate;
   depositing a second ink permeative layer over a second face of the substrate;
   providing print data according to a design of the instrument panel including at least a symbol;
   jetting ink to the first ink permeative layer to form a shape of the symbol; and
   jetting ink to the second ink permeative layer to exclude an area corresponding to the shape of the symbol.

2. The manufacturing method as set forth in claim 1, further comprising the step of providing an adhesive layer between the substrate and one of the first and second ink permeative layers.

3. The manufacturing method as set forth in claim 1, wherein the substrate is transparent.

4. The manufacturing method as set forth in claim 1, wherein the print data is provided in the form of digital print data.

5. The manufacturing method as set forth in claim 1, wherein the
   at least one of the first ink permeative layer and the second ink permeative layer is made of a heat-resistant material containing 20 to 80% of at least one of urethane resin and polyester resin, and the print data is provided as digital print data such that the symbol is in the form of at least one of indicative scales, indicative numerals and indicative characters on the instrument panel which are visually presented to a driver; and
   the jetting ink to the first ink permeative layer and the second ink permeative layer is done in accordance with the digital print data.

6. The manufacturing method as set forth in claim 5, further comprising the step of determining the design of the instrument panel according to a request of the driver.

7. The manufacturing method as set forth in claim 5, further comprising the step of providing an adhesive layer between the substrate and the ink permeative layer.

* * * * *